United States Patent
Razavi Majomard et al.

(10) Patent No.: US 11,652,507 B1
(45) Date of Patent: May 16, 2023

(54) OPTIMIZATION OF TRAINING AND RETRAINING

(71) Applicant: Marvell Asia Pte Ltd, Singapore (SG)

(72) Inventors: Seid Alireza Razavi Majomard, Belmont, CA (US); Ehab Tahir, Mississauga (CA)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/664,452

(22) Filed: May 23, 2022

Related U.S. Application Data

(60) Provisional application No. 63/192,443, filed on May 24, 2021.

(51) Int. Cl.
*H04B 3/46* (2015.01)
*H04B 3/20* (2006.01)

(52) U.S. Cl.
CPC ................. *H04B 3/46* (2013.01); *H04B 3/20* (2013.01)

(58) Field of Classification Search
CPC ........ H04B 7/0617; H04B 7/063; H04B 3/46; H04B 3/20
See application file for complete search history.

(56) References Cited

U.S. PATENT DOCUMENTS

| | | | |
|---|---|---|---|
| 2016/0285522 A1* | 9/2016 | Kasher | H04B 7/043 |
| 2017/0359513 A1* | 12/2017 | Anantharaman | H04N 5/232411 |
| 2018/0181172 A1* | 6/2018 | Johnsen | G06F 1/24 |
| 2019/0173544 A1* | 6/2019 | Vu | H04B 7/0617 |
| 2020/0226084 A1* | 7/2020 | Das Sharma | H04L 45/24 |

* cited by examiner

*Primary Examiner* — Khanh C Tran

(57) ABSTRACT

Systems and methods are described for dynamically updating a duration of link training time for a first stage of link training implemented to set up a first characteristic of a link connection between a physical layer transceiver (PHY) and a link partner. A first stage of link training preconfigured to last for a first duration of time is initiated and a metric of link quality that measures a link connection quality is initiated. Based on the determined metric of link quality, updating the first duration of time for the first stage of link training.

20 Claims, 3 Drawing Sheets

OPTIMIZATION OF TRAINING AND RETRAINING

CROSS-REFERENCE TO RELATED APPLICATION

This disclosure claims the benefit under 35 U.S.C. § 119(e) of U.S. Provisional Patent Application No. 63/192,443, filed May 24, 2021, which is hereby incorporated by reference herein in its entirety.

BACKGROUND OF THE INVENTION

This disclosure is related generally to timing of stages of training and retraining in communication networks. More particularly, systems and methods are described which handle prioritization of requests from client devices based on the amount of bandwidth allocated to that client device.

When initially establishing a link between two physical layer transceivers (PHYs) over a long distance (e.g., a 100-meter cable), training is necessary to adjust and compensate for signal issues such as echo and different types of crosstalk (e.g., far-end cross talk (FEXT) and near-end cross talk (NEXT)), and any other undesired effect on a signal in the communication pathway. This initial training requires a relatively large number of clock cycles, which could impact performance by delaying the start of communication. Once the link is established and the PHY devices enter data mode, electromagnetic interference from external sources caused by emission, radiation, and induction may degrade the quality of the link and cause a link to become wholly or partially inoperative, which sometimes is referred to as a "link drop." In case of a link drop situation, it is preferable to reestablish the link using a fast retrain (FR) process, rather than repeating the entire initial link training.

Both initial link training and retrain techniques require multiple stages to establish the connection, with each stage optimizing a particular parameter or characteristic of the link to strengthen or de-noise the connection to achieve the best possible conditions for transmission of information on the link. For example, while establishing a link connection between a PHY and a link partner, stages of link training may account for crosstalk, echo, electromagnetic interference from nearby signals, any other data transfer between the devices, and/or any combination thereof. Timing for training and retraining is rigidly defined by the relevant standard for the link being trained or retrained. For example, link training for 10G BASE-T which is defined by the IEEE 802.3an standard, and for 5G/2.5G BASE-T which is defined by the IEEE 802.3bz standard, both require a training time no longer than 2 seconds. Link training for multi-rate automobile systems as defined by the IEEE 802.3ch standard requires a training time no longer than 100 ms. Fast retrain for mitigating the effect of narrow band electromagnetic interference (EMI) generated by nearby devices is defined to have a maximum training time of 30 ms in the standards governing 10G/5G/2.5G BASE-T. The sum of all of the stages of either the training or retraining process must take less than the relevant maximum training time. Typical available PHYs use a fixed time for training all channels.

SUMMARY

Implementations described herein provide a method and apparatus for dynamically updating a duration of link training time for a first stage of link training implemented to set up a first characteristic of a link connection between a physical layer transceiver (PHY) and a link partner. The method includes initiating the first stage of link training preconfigured to last for a first duration of time then determining a metric of link quality that measures a link connection quality. Based on the determined metric of link quality, updating the first duration of time for the first stage of link training.

In some implementations, a second stage of link training implemented to set up a second characteristic of the link connection and preconfigured to last for a second duration of time and a second metric of link quality that measures a link connection quality is determined. Based on the determined second metric of link quality, updating the second duration of time for the second stage of link training.

In some implementations, when the metric of link quality indicates that the link connection is weak, the first duration of time for the first stage of link training is increased. In some implementations, when the metric of link quality indicates that the link connection is strong, the first duration of time for the first stage of link training is decreased.

In some implementations, determining the metric of link quality that measures the link connection quality comprises at least one of determining a cable length used for the link connection and determining a signal-to-noise ratio for the link connection.

In some implementations, the first stage of link training is initiated during an initial link training process when establishing the link connection between the PHY and the link partner. In some implementations, the first stage of link training is initiated in response to a retrain process being triggered. In some implementations, the retrain process is triggered by the link connection being dropped due to electromagnetic interference.

In some implementations, the method updates the hardware used during the first stage of link training based on the determined metric of link quality. In other implementations, the method updates an amount of power used during the first stage of link training based on the determined metric of link quality.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
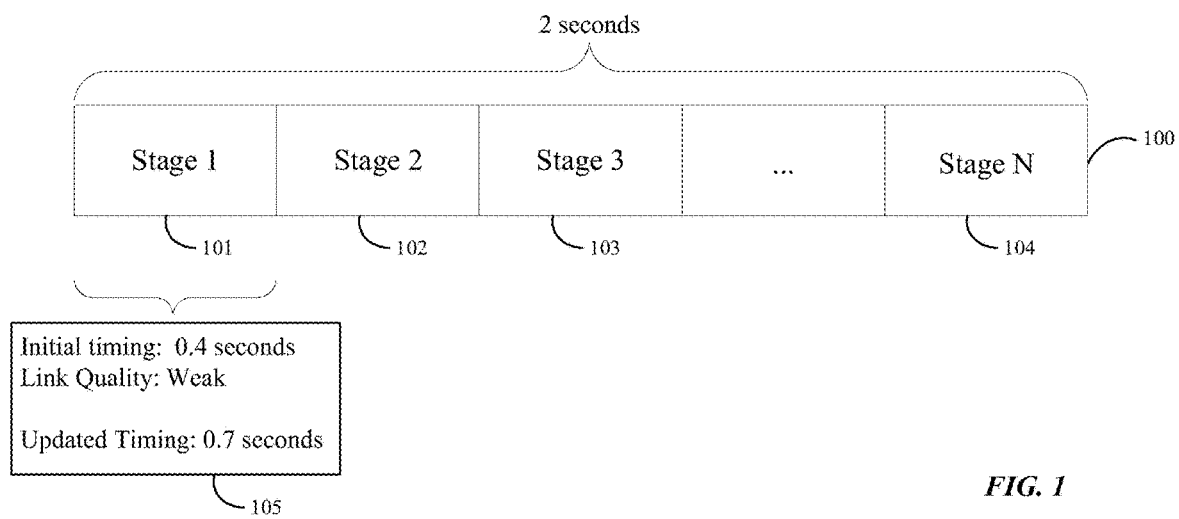
FIG. 1 is a block diagram illustrating a link training process split into multiple stages in which the link quality is determined to be weak.

As described above, training and retraining a communication link between a PHY and link partner requires multiple stages of data transfer. Each stage achieves a particular goal such as accounting for crosstalk, echo, electromagnetic interference from nearby signals, any other data transfer between the devices, and/or any combination thereof. Each of these stages has a predefined fixed interval defined by the standard describing the training or retraining process.

Using fixed intervals for each stage of training or retraining of a link based on a maximum duration allowed by the relevant standard does not allow for optimization of the process for each particular communication link or system. That is, fixed training intervals do not allow one to take advantage of conditions that might allow faster training. Because the maximum permitted training time is used regardless of conditions that might allow a shorter training interval, there may be higher power consumption in the PHY than necessary, and systems have to be built with the necessary capacity for such consumption. In data centers and enterprise applications, each switch may include as many as 96 PHYs, so that additional capacity is costly.

Using fixed training or retraining times also wastes time for channels with channel conditions that can be resolved quickly, and conversely may not provide sufficient time to resolve more difficult channel conditions. Similarly, while optimizing a device for the most extreme possible channel conditions for a standard cable also allows any channel with less extreme conditions to be connected, this wastes time and involves unnecessary hardware for the less extreme channel conditions. Allowing for more flexibility in training, e.g., a longer training process, would allow for more successful training in non-standard setups. Additionally, compliant but non-standard channels may not be supported. For example, the 5G BASE-T standard supports up to a 100 meter cat5e cable, but a system that does not allow for nonstandard cable support does not allow longer cables even if otherwise compliant.

In summary, fixed timing for training or retraining is inefficient and may cause delays in the restart of normal data flow. In cases of weak interference, retraining can be completed more quickly than the training time set by the standards. On the other hand, in cases of strong interference, consecutive retraining attempts may be required, so using a fixed training time may lead to even longer data interruption.

Therefore, in accordance with implementations of the subject matter of this disclosure, a system for flexible timing of training and retraining based on needs of the communication system and the channel is provided. A training or retraining operation may be broken into multiple stages with defined goals, as discussed above. Each of these stages may have a duration of training time optimized for the needs of the particular stage, as well as the channel conditions. The duration of each stage may depend on a signal-to-noise ratio of the link, cable length, any other link qualities, and/or any combination thereof.

The time duration for any stage of a training or retraining operation with favorable channel conditions, such as lower interference, may be decreased. In some cases, the time duration for a training or retraining operation may be increased, with a trade-off of reduction the amount of hardware required, or because the duration is increased, lower peak power may be used, and therefore less costly hardware may be provided. Additionally, longer cables than provided by the standard may be supported by a PHY using longer training times. This may be advantageous in cellular radio towers, which may require longer cables (e.g., up to 200 m).

The subject matter of this disclosure may be better understood by reference to FIGS. 1-4.

FIG. 1 is a block diagram illustrating a link training process 100 that is split into multiple stages—e.g., N stages—as shown by 101, 102, 103, and 104 (in this case, N=4).

A training process is designed to optimize the PHY settings to deliver certain performance metrics in the data mode. For example, one performance metric is probability of bit error that can be as low as $10^{-15}$. Getting to this level of performance requires optimum settings in the PHY. Optimizing the settings is achieved by a training process, which may be divided to states. Each state may have its own goals or performance metrics, which may depend on various factors such as a governing standard and specifics of the hardware being used.

The degree to which the goals of a training state are achieved may be characterized as "strong" or "weak." For example, the training process may be a state such as a "SILENT" state for a 10G BASE-T device, and each device in the link connection may have multiple goals for the training process. These goals may be, for example, adjusting gain and other analog settings, locking the timing recovery, finding the correct sampling phase, and achieving a signal-to-noise ratio above a predetermined threshold.

Stages 101, 102, 103, and 104 represent stages which attempt to achieve respective ones of the goals of the training process. In general, training performance may be characterized as "strong" or weak" by assessing whether all of the training goals have been met. If all, or some predetermined minimum portion, of the training goals are met, the performance may be considered "strong," but if fewer than all, or fewer than the predetermined minimum portion, of the training goals are met, the performance may be considered "weak."

Assessing each of these goals, and therefore assessing whether the performance in the training state is weak or strong, depends on the specific goal. For example, for the goal of having the right analog setting and gain, the signal power at the output of analog circuit can be measured to make sure the analog gains are correct. For the goal of locking the timing recovery, there is a flag indicating the timing recovery lock. For the goal of finding the right sampling phase, if the sampling phase is not correct, then the signal power spectrum density has low gain at Nyquist frequency. For the goal of achieving a signal-to-noise ratio greater than a threshold, the signal-to-noise ratio can be measured. If any of these goals is not achieved, the training at this stage is considered to be weak. In this case, it may make sense to increase the training time. However, if the desired goal is achieved sooner than anticipated, the training at this stage is strong and it may make sense to shorten this state of training and move onto the next state or goal faster. The PHY device optimizing the training time must communicate with the link partner to ensure that the link partner agrees with the adjustments made to the training time. This may be achieved with an info field.

In the implementation shown in FIG. 1, the total training time is required to take less than 2 seconds. Information about stage 1 is shown at 105. Stage 1 is preconfigured to take 0.4 seconds.

However, the link quality may be determined to be weak. The link quality measurement may be based on the length of the cable, a signal-to-noise ratio, the strength of interference impacting the link connection, any other measure of link quality, and/or any combination thereof. If the link quality is weak, the system may determine that stage 1 requires more time to be performed and may update the required time to 0.7 seconds. In some implementations, the training time may be increased to reduce the peak voltage during the training process. This may be achieved by increasing the training time and reducing the number of adaptation operations per second during the training process. In other implementations, the system may update the amount of hardware used during training in addition to or instead of updating the training timing. Updating the hardware used can change the peak voltage during link training by reducing the power consumption of the hardware during operation.

Other adjustments may be made in addition to or instead of adjusting the training time. The power consumption of the PHY may be adjusted by changing the amount of surge power used during each stage of training. The adjustments may depend on surrounding conditions, including the capabilities of the system (i.e., the capabilities of the PHY itself as well as associated circuitry—e.g., on a printed circuit board on which the PHY is mounted). Some relevant system capabilities may include power regulation and the ability to dissipate heat. For example, a system may or may not include a fan or other provisions to dissipate heat generated by the PHY. In such a case, the training operation can be slowed down to control the PHY or system temperature. In another example, if the system does not have enough power regulators, the training operation can be slowed down to avoid a power outage during the training.

In these cases, while the PHY may measure the temperature and/or voltage by itself, feedback from the broader system also may be provided, either before or during training or during operation. Before training, the system can inform the PHY about system capabilities to dissipate heat, as well as limits of system voltage regulators, including average or maximum current output, and how long maximum current can be sustained. Similarly, during operation, the system can pass information to the PHY about system temperature, or variations in voltage regulator output.

Figure 2:
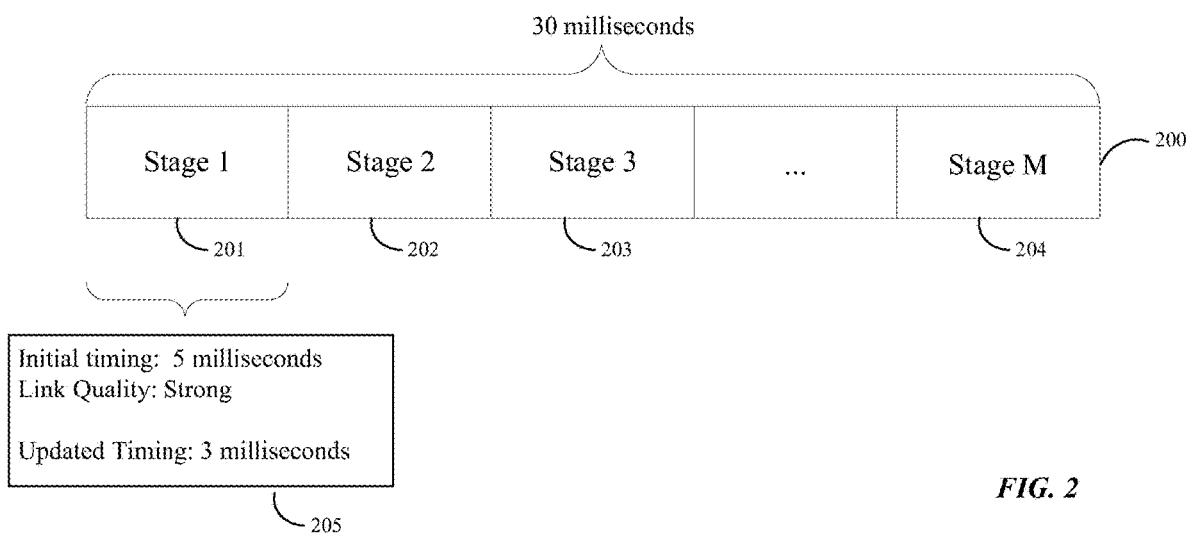
FIG. 2 is a block diagram illustrating a link training process split into multiple stages in which the link quality is determined to be strong.

FIG. 2 is a block diagram illustrating a link training process split into multiple stages in which the link quality is determined to be strong. The process 200 of link training may be broken into M stages, as shown by 201, 202, 203, and 204 (in this case, M=4).

In this implementation, the total training time is required to take less than 30 milliseconds. Information about stage 1 is shown in box 205. Stage 1 is preconfigured to take 5 milliseconds.

However, the link quality is determined to be strong. If the link quality is strong, the system may determine that stage 1 requires less time to be performed and update the required time to 3 milliseconds. This allows the system to not waste extra time on stage 1 which can be completed faster than it is preconfigured to.

Figure 3:
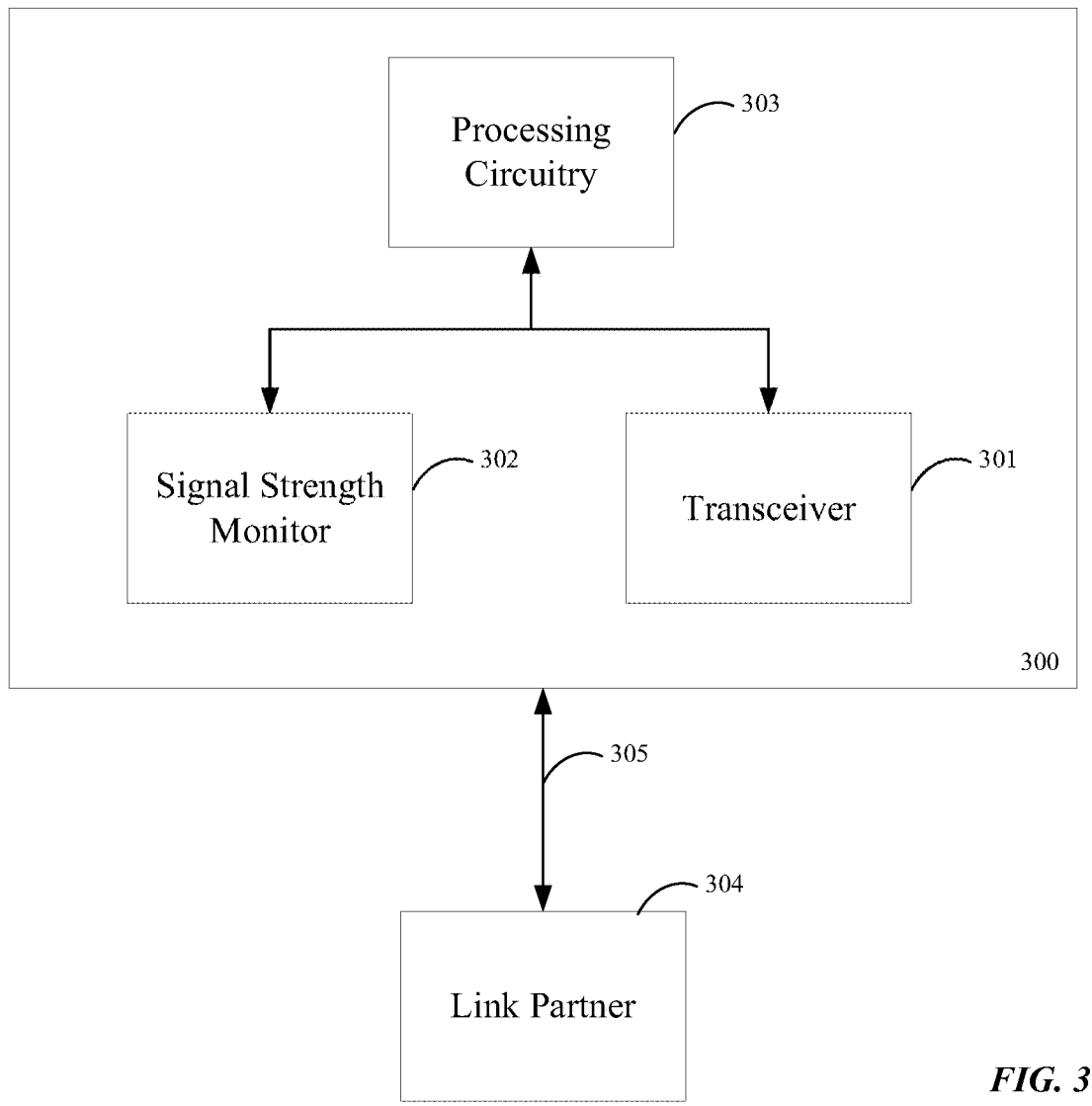
FIG. 3 is a high-level block diagram of a link partner communicating with a PHY, with which implementations of this disclosure may be used.

FIG. 3 is a high-level block diagram of a link partner communicating with a PHY with which implementations of this disclosure may be used. As shown in FIG. 3, PHY 300 includes transceiver 301, a signal strength monitor 302, and processing circuitry 303. PHY 300 communicates with link partner 304.

PHY 300 includes transceiver 301 which communicates with link partner 304 over communication link 305. In accordance with an implementation of the subject matter of this disclosure, PHY 300 is connected to link partner 304 by a single twisted pair cable, which may be shielded or unshielded, although other types of cabling (e.g., coaxial cable) may be used without departing from the subject matter of this disclosure. Communication link 300 may be established using link training or retraining.

Signal strength monitor 302 receives information from transceiver 301 about the strength of a signal received by link partner 304 including channel conditions such as the amount of echo, amount of crosstalk, amount of interference, cable length, any other channel conditions, and/or any combination thereof. Transceiver 301 may include communication circuitry which initiates link training or retraining to establish communication link 305. This link training or retraining is implemented in stages which are each preconfigured to last for a duration of time.

Processing circuitry 303 receives signal strength information from signal strength monitor 302 and determines if the timing for the stage of link training or retraining to be implemented by transceiver 301 should be adjusted.

Figure 4:
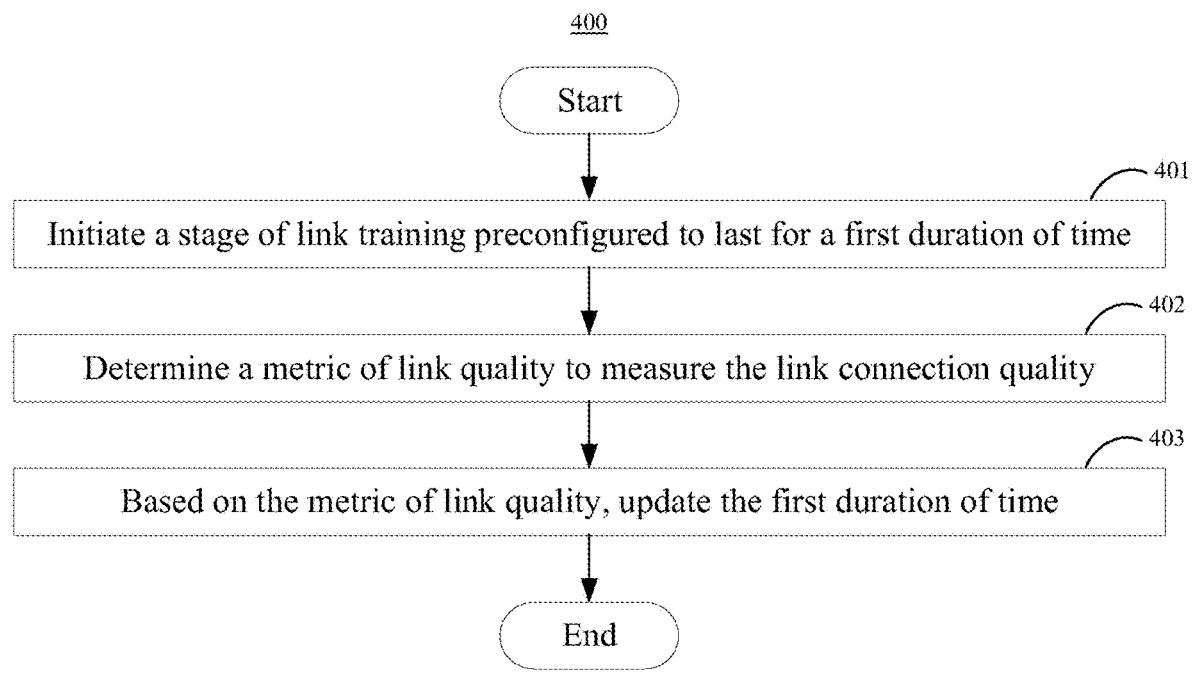
FIG. 4 is a flow diagram illustrating a method according to implementations of the subject matter of this disclosure for updating the duration of time for a stage of link training.

FIG. 4 is a flow diagram illustrating a method 200 according to implementations of the subject matter of this disclosure for updating the duration of time for a stage of link training. Method 200 may be carried out, e.g., by processing circuitry 303 to determine whether the timing for the stage of link training or retraining to be implemented by transceiver 301 should be adjusted.

At 401, a stage of link training is initiated. The stage of link training is preconfigured to last for a fixed time. This fixed time may be set by a standard of operation for the device. At 402, a metric of link quality is determined which measures the link connection quality. This link connection quality determines the state of the link connection between the PHY and the link partner, such as the length of the cable, any kinks in the cable, echo, crosstalk, level of electromagnetic interference impacting the link, any other measures of link quality, and/or any combination thereof.

At 403, the duration of time for the stage of link training is updated based on the metric of link quality. If the link quality is low, such as the cable is longer than the standard cable, there cable has many kinks, the electromagnetic interference is high, or any other undesirable link connection qualities, then the timing for the stage of link quality may be increased. If the link quality is high, such as the cable is shorter, there are no kinks in the cable, the electromagnetic interference is low, or any other higher quality link connection qualities, then the timing for the stage of link quality may be decreased.

What is claimed is:

1. A method for dynamically updating a duration of link training time for a first stage of link training implemented to set up a first characteristic of a link connection between a physical layer transceiver (PHY) and a link partner, the method comprising:
    initiating the first stage of link training preconfigured to last for a first duration of time;
    determining a metric of link quality that measures a link connection quality; and
    based on the determined metric of link quality, updating the first duration of time for the first stage of link training.

2. The method of claim 1, further comprising:
    initiating a second stage of link training implemented to set up a second characteristic of the link connection and preconfigured to last for a second duration of time;
    determining a second metric of link quality that measures a link connection quality; and
    based on the determined second metric of link quality, updating the second duration of time for the second stage of link training.

3. The method of claim 1, further comprising:
    when the metric of link quality indicates that the link connection is weak, increasing the first duration of time for the first stage of link training.

4. The method of claim 1, further comprising:
when the metric of link quality indicates that the link connection is strong, decreasing the first duration of time for the first stage of link training.

5. The method of claim 1, wherein determining the metric of link quality that measures the link connection quality comprises at least one of determining a cable length used for the link connection and determining a signal-to-noise ratio for the link connection.

6. The method of claim 1, wherein the first stage of link training is initiated during an initial link training process when establishing the link connection between the PHY and the link partner.

7. The method of claim 1, wherein the first stage of link training is initiated in response to a retrain process being triggered.

8. The method of claim 7, wherein the retrain process is triggered by the link connection being dropped due to electromagnetic interference.

9. The method of claim 1 further comprising:
based on the determined metric of link quality, updating hardware used during the first stage of link training.

10. The method of claim 1, further comprising:
based on the determined metric of link quality, updating an amount of power used during the first stage of link training.

11. A physical layer transceiver (PHY) for dynamically updating a duration of link training time for a first stage of link training implemented to set up a first characteristic of a link connection between a physical layer transceiver (PHY) and a link partner, the PHY comprising:
communication circuitry configured to initiate the first stage of link training preconfigured to last for a first duration of time; and
control circuitry configured to:
(i) determine a metric of link quality that measures a link connection quality; and
(ii) based on the determined metric of link quality, update the first duration of time for the first stage of link training.

12. The PHY of claim 11, wherein the communication circuitry is further configured to:
initiate a second stage of link training implemented to set up a second characteristic of the link connection and preconfigured to last for a second duration of time;
and the control circuitry is further configured to:
(i) determine a second metric of link quality that measures a link connection quality; and
(ii) based on the determined second metric of link quality, update the second duration of time for the second stage of link training.

13. The PHY of claim 11, wherein the control circuitry is further configured to, when the metric of link quality indicates that the link connection is weak, increase the first duration of time for the first stage of link training.

14. The PHY of claim 11, wherein the control circuitry is further configured to, when the metric of link quality indicates that the link connection is strong, decrease the first duration of time for the first stage of link training.

15. The PHY of claim 11, wherein the control circuitry is further configured to:
when determining the metric of link quality that measures the link connection quality, determine at least one of a cable length used for the link connection and a signal-to-noise ratio for the link connection.

16. The PHY of claim 11, wherein the control circuitry is further configured to initiate the first stage of link training during an initial link training process when establishing the link connection between the PHY and the link partner.

17. The PHY of claim 11, wherein the control circuitry is further configured to initiate the first stage of link training in response to a retrain process being triggered.

18. The PHY of claim 17, wherein the retrain process is triggered by the link connection being dropped due to electromagnetic interference.

19. The PHY of claim 11, wherein the control circuitry is further configured to:
based on the determined metric of link quality, update hardware used during the first stage of link training.

20. The PHY of claim 19, wherein the control circuitry is further configured to:
based on the determined metric of link quality, update an amount of power used during the first stage of link training.

* * * * *